United States Patent
Sahara et al.

(10) Patent No.: US 12,196,846 B2
(45) Date of Patent: Jan. 14, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Tooru Sahara, Yokohama (JP); Satoshi Kawaji, Yokohama (JP); Youhei Murakami, Yokohama (JP); Masayuki Sato, Yokohama (JP); Takuya Homma, Yokohama (JP); Masamitsu Nishikido, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 565 days.

(21) Appl. No.: 17/595,135

(22) PCT Filed: May 12, 2020

(86) PCT No.: PCT/JP2020/018946
§ 371 (c)(1),
(2) Date: Nov. 9, 2021

(87) PCT Pub. No.: WO2020/241234
PCT Pub. Date: Dec. 3, 2020

(65) Prior Publication Data
US 2022/0214440 A1   Jul. 7, 2022

(30) Foreign Application Priority Data
May 29, 2019   (JP) .................. 2019-100700

(51) Int. Cl.
*G01S 13/536*   (2006.01)
*G01S 7/35*   (2006.01)
*G01S 13/931*   (2020.01)

(52) U.S. Cl.
CPC ............ *G01S 13/536* (2013.01); *G01S 7/354* (2013.01); *G01S 13/931* (2013.01)

(58) Field of Classification Search
CPC ....... G01S 13/536; G01S 7/354; G01S 13/931
(Continued)

(56) References Cited

U.S. PATENT DOCUMENTS 8,624,780 B2 *   1/2014   Gonikberg ........... H04B 7/0865
                                                                342/422
9,354,299 B2 *   5/2016   Ishimori ................ G01S 13/345
(Continued)

FOREIGN PATENT DOCUMENTS

JP   H11-133144 A   5/1999
JP   2006-292597 A   10/2006
(Continued)

OTHER PUBLICATIONS

Li, Daojing et al., "2D-OS-CFAR detector for cloud clutter suppression," 2001 CIE International Conference on Radar Proceedings (Cat No. 01TH8559); IEEE; Oct. 15-18, 2001; pp. 350-353, Beijing, China.

*Primary Examiner* — Nuzhat Pervin
(74) *Attorney, Agent, or Firm* — Studebaker & Brackett PC

(57) ABSTRACT

An electronic device includes a transmission antenna that transmits a transmission wave, a reception antenna that receives a reflected wave that is the transmission wave having been reflected, and a control unit. The control unit detects a target by using a constant false alarm rate, based on a transmission signal transmitted as the transmission wave and a reception signal received as the reflected wave. The control unit establishes reference regions non-contiguously in a distance direction and a relative velocity direction with respect to a test region in a two-dimensional distribution of signal intensities based on the reception signal in the distance direction and the relative velocity direction. The control unit sets a threshold for use in detection of the target, (Continued)

based on an order statistic among the signal intensities in the reference regions.

16 Claims, 7 Drawing Sheets

(58) Field of Classification Search
USPC .......................................................... 342/93
See application file for complete search history.

(56) References Cited

U.S. PATENT DOCUMENTS

| | | | | |
|---|---|---|---|---|
| 9,696,417 | B2* | 7/2017 | Hayakawa | G01S 13/424 |
| 9,702,967 | B2* | 7/2017 | Luebbert | G01S 13/34 |
| 10,205,457 | B1* | 2/2019 | Josefsberg | H03L 7/091 |
| 11,016,171 | B2* | 5/2021 | Melzer | G01S 7/354 |
| 11,313,943 | B2* | 4/2022 | Moss | G01S 13/343 |
| 11,340,332 | B2* | 5/2022 | Cho | G01S 7/414 |
| 11,379,541 | B2* | 7/2022 | Ricci | G06F 21/32 |
| 12,032,089 | B2* | 7/2024 | Meissner | G06N 3/084 |
| 2007/0211916 | A1* | 9/2007 | Smith | G01S 13/04 |
| | | | | 382/103 |
| 2010/0073218 | A1* | 3/2010 | Stockmann | G01S 13/5248 |
| | | | | 342/146 |
| 2015/0293208 | A1* | 10/2015 | Lee | G01S 7/292 |
| | | | | 342/27 |
| 2016/0334512 | A1* | 11/2016 | Borgonovo | G01S 13/5246 |
| 2018/0172813 | A1* | 6/2018 | Rao | G01S 13/343 |
| 2018/0211525 | A1* | 7/2018 | Arnold | G01S 13/91 |
| 2019/0120955 | A1* | 4/2019 | Zhong | G01S 13/931 |
| 2020/0209380 | A1* | 7/2020 | Takayama | G01S 7/352 |
| 2022/0291372 | A1* | 9/2022 | Sahara | G01S 13/60 |
| 2023/0168358 | A1* | 6/2023 | Cieslar | B60W 40/114 |
| | | | | 342/70 |

FOREIGN PATENT DOCUMENTS

| | | | |
|---|---|---|---|
| JP | 2006-305337 A | 11/2006 | |
| JP | 6192910 B2 * | 9/2017 | ............ G01S 13/42 |
| KR | 10-2018-0118007 A | 10/2018 | |

* cited by examiner

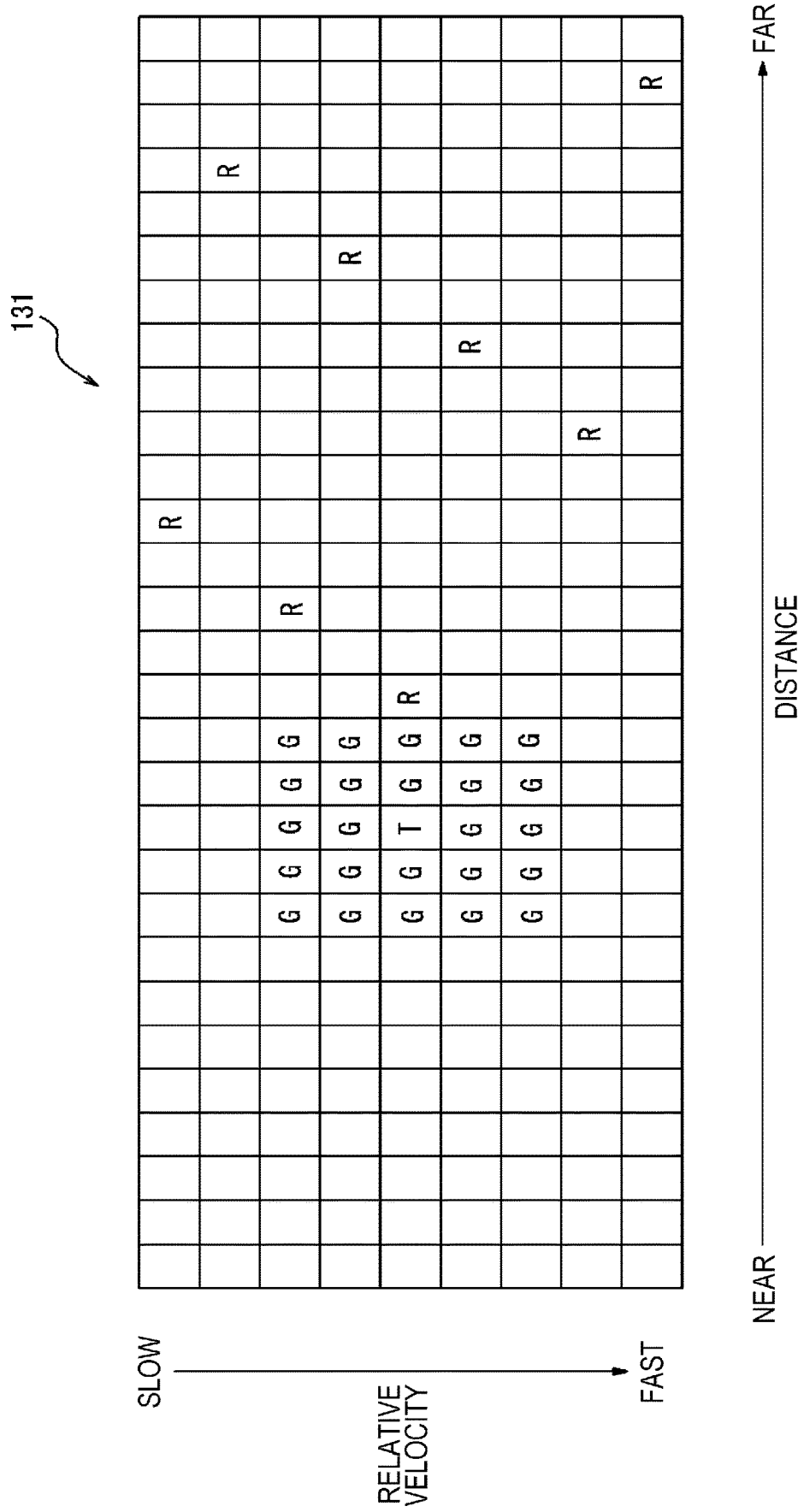

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2019-100700 filed in Japan on May 29, 2019, the entire disclosure of which is incorporated herein by reference.

TECHNICAL FIELD

The present disclosure relates to an electronic device, a method for controlling an electronic device, and a program.

BACKGROUND ART

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and receiving a reflected wave reflected off the object. Such a technology for measuring a distance or the like expectedly becomes more important in the future with progresses of a technology for assisting drivers in driving and a technology related to automated driving for partially or entirely automating driving.

Various suggestions have been made in relation to a technology for detecting the presence of a predetermined object by receiving a reflected wave of a radio wave that has been transmitted and reflected off the object. For example, PTL 1 discloses an FM-CW radar device. The FM-CW radar device performs linear frequency modulation (FM) on a transmission signal at a particular period, and radiates the transmission signal toward a target object. The FM-CW radar device then detects a beat signal on the basis of a difference between the transmission signal and a reception signal from the target object, and measures a distance and/or a velocity through frequency analysis of this signal.

CITATION LIST

Patent Literature

PTL 1: Japanese Unexamined Patent Application Publication No. 11-133144

SUMMARY OF INVENTION

In one embodiment, an electronic device includes a transmission antenna that transmits a transmission wave, a reception antenna that receives a reflected wave that is the transmission wave having been reflected, and a control unit.

The control unit detects a target by using a constant false alarm rate, based on a transmission signal transmitted as the transmission wave and a reception signal received as the reflected wave.

The control unit establishes reference regions non-contiguously in a distance direction and a relative velocity direction with respect to a test region in a two-dimensional distribution of signal intensities based on the reception signal in the distance direction and the relative velocity direction, and sets a threshold for use in detection of the target, based on an order statistic among the signal intensities in the reference regions.

In one embodiment, a method for controlling an electronic device includes steps as follows:

(1) a step of transmitting a transmission wave from a transmission antenna;
(2) a step of receiving, from a reception antenna, a reflected wave that is the transmission wave having been reflected;
(3) a step of detecting a target by using a constant false alarm rate, based on a transmission signal transmitted as the transmission wave and a reception signal received as the reflected wave;
(4) a step of establishing reference regions non-contiguously in a distance direction and a relative velocity direction with respect to a test region in a two-dimensional distribution of signal intensities based on the reception signal in the distance direction and the relative velocity direction; and
(5) a step of setting a threshold for use in detection of the target, based on an order statistic among the signal intensities in the reference regions.

In one embodiment, a program causes a computer to perform the steps (1) to (5) above.

BRIEF DESCRIPTION OF DRAWINGS

FIG. 7 is a diagram for describing an example of processing of the control unit according to the one embodiment.

DESCRIPTION OF EMBODIMENTS

The target detection accuracy is desirably improved in a technology for detecting a predetermined object by receiving a reflected wave that is a transmitted transmission wave reflected off the object. An object of the present disclosure is to provide an electronic device, a method for controlling an electronic device, and a program that can improve the target detection accuracy. According to one embodiment, an electronic device, a method for controlling an electronic device, and a program that can improve the target detection accuracy can be provided. One embodiment is described in detail below with reference to the drawings.

An electronic device according to one embodiment is mounted in a vehicle (mobility device) such as an automobile, for example, and thus is capable of detecting, as a target, a predetermined object located around the mobility device. To this end, the electronic device according to the one embodiment is capable of transmitting a transmission wave to an area around the mobility device from a transmission antenna installed on the mobility device. The electronic device according to the one embodiment is also capable of receiving a reflected wave that is the transmission wave having been reflected, from a reception antenna installed on the mobility device. At least one of the transmission antenna and the reception antenna may be included in a radar sensor or the like installed on the mobility device, for example.

A configuration in which the electronic device according to the one embodiment is mounted in an automobile such as a passenger car is described below as a typical example. However, the mobility device in which the electronic device according to the one embodiment is mounted is not limited to an automobile. The electronic device according to the one embodiment may be mounted in various mobility devices such as a bus, a taxi, a truck, a motorcycle, a bicycle, a ship, an aircraft, a helicopter, a farm vehicle such as a tractor, a snowplow, a garbage truck, a police car, an ambulance, and a drone. The mobility device in which the electronic device according to the one embodiment is mounted is not necessarily limited to a mobility device that moves by its own motive power. For example, the mobility device in which the electronic device according to the one embodiment is mounted may be a trailer towed by a tractor. The electronic device according to the one embodiment is capable of measuring a distance or the like between the sensor and a predetermined object when at least one of the sensor and the object is movable. The electronic device according to the one embodiment is also capable of measuring the distance or the like between the sensor and the object even when both the sensor and the object are stationary.

An example of how the electronic device according to the one embodiment detects an object is described first.

Figure 1:
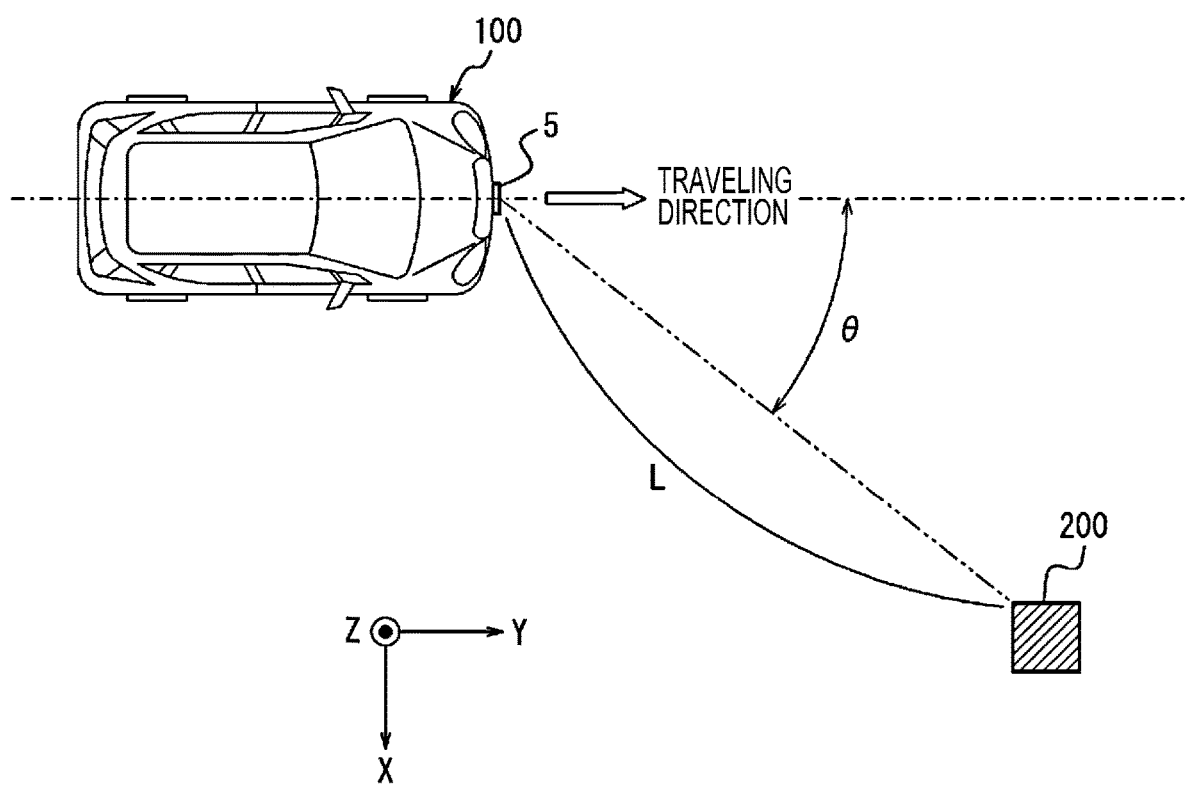
FIG. 1 is a diagram for describing how an electronic device according to one embodiment is used.

FIG. 1 is a diagram for describing how the electronic device according to the one embodiment is used. FIG. 1 illustrates an example in which a sensor including a transmission antenna and a reception antenna according to the one embodiment is installed on a mobility device.

A sensor 5 including a transmission antenna and a reception antenna according to the one embodiment is installed on a mobility device 100 illustrated in FIG. 1. It is assumed that an electronic device 1 according to the one embodiment is also mounted (for example, built) in the mobility device 100 illustrated in FIG. 1. A specific configuration of the electronic device 1 is described later. The sensor 5 may include at least one of the transmission antenna and the reception antenna, for example. The sensor 5 may also appropriately include at least any of other functional units, such as at least part of a control unit 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed by the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object as the target.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect, as the target, the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival 9) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling side by side with the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, an animal, an insect, other forms of life, a guardrail, a median strip, a road sign, a step on a sidewalk, a wall, a manhole, or an obstacle. The object 200 may be in motion or stationary. For example, the object 200 may be an automobile or the like that is parked or stationary around the mobility device 100.

In FIG. 1, a ratio between a size of the sensor 5 and a size of the mobility device 100 does not necessarily indicate an actual ratio. FIG. 1 illustrates the sensor 5 that is installed on an outer portion of the mobility device 100. However, in the one embodiment, the sensor 5 may be installed at various positions of the mobility device 100. For example, in one embodiment, the sensor 5 may be installed inside a bumper of the mobility device 100 so as not to be seen in the appearance of the mobility device 100.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
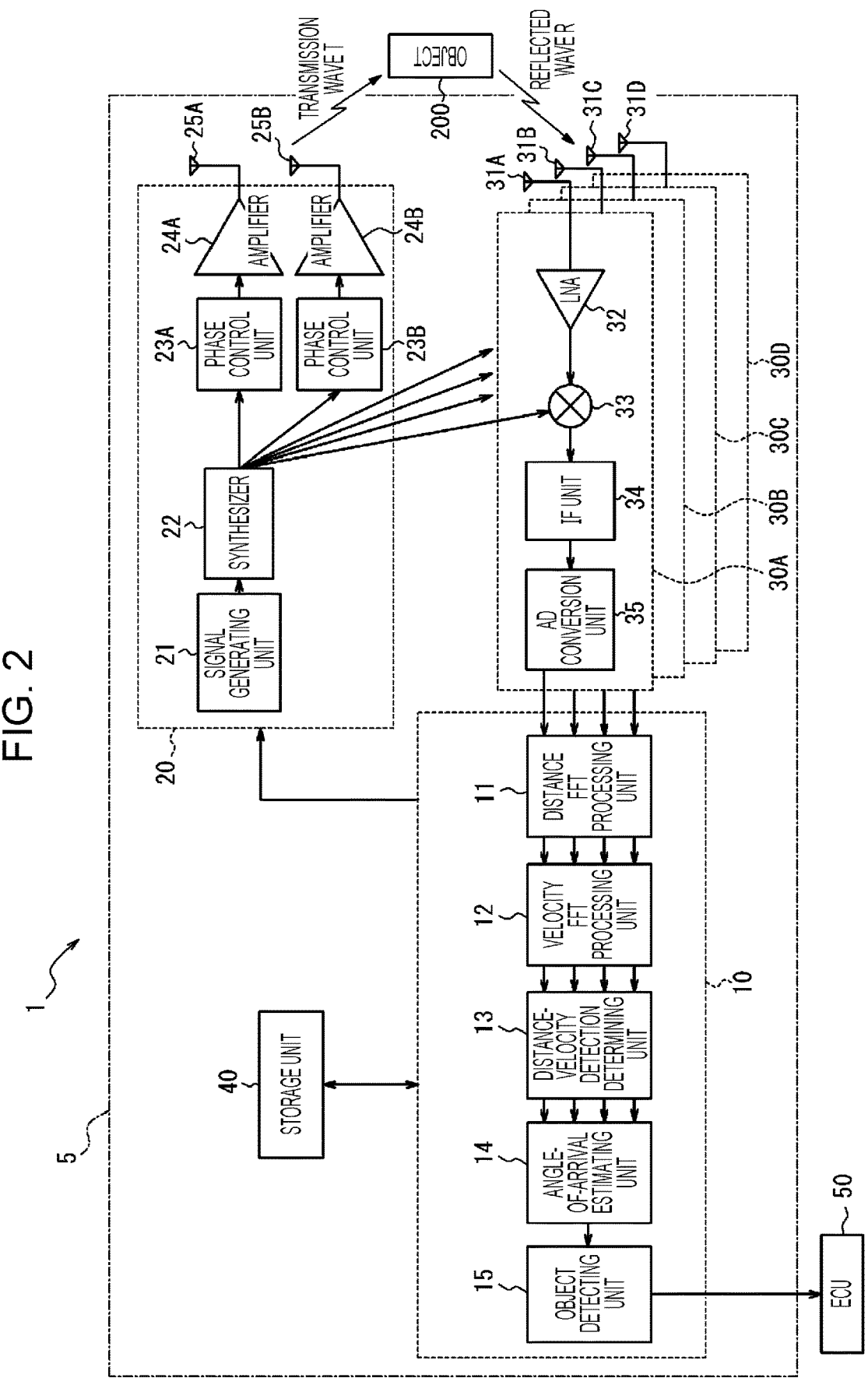
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency bandwidth of 79 GHz has a characteristic that the usable frequency bandwidth is wider than another millimeter-wave and/or quasi-millimeter-wave radar of a frequency band of 24 GHz, 60 GHz, or 76 GHz, for example. Such an embodiment is described below as an example.

As illustrated in FIG. 2, the electronic device 1 according to the one embodiment is constituted by the sensor 5 and an ECU (Electronic Control Unit) 50. The ECU 50 controls various operations of the mobility device 100. The ECU 50 may be constituted by at least one or more ECUs. The electronic device 1 according to the one embodiment includes the control unit 10. The electronic device 1 according to the one embodiment may also appropriately include another functional unit such as at least any of a transmission unit 20, reception units 30A to 30D, and a storage unit 40. As illustrated in FIG. 2, the electronic device 1 may include a plurality of reception units such as the reception units 30A to 30D. When the reception units 30A, 30B, 30C, and 30D are not distinguished from one another, the reception units 30A, 30B, 30C, and 30D are simply referred to as "reception units 30" below.

The control unit 10 may include a distance FFT processing unit 11, a velocity FFT processing unit 12, a distance-velocity detection determining unit 13, an angle-of-arrival estimating unit 14, and an object detecting unit 15. These functional units included in the control unit 10 are further described later.

As illustrated in FIG. 2, the transmission unit 20 may include a signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the plurality of reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the control unit 10.

The control unit 10 included in the electronic device 1 according to the one embodiment is capable of controlling the individual functional units of the electronic device 1 and also controlling operations of the entire electronic device 1. To provide control and processing capabilities for executing various functions, the control unit 10 may include at least one processor, for example, a CPU (Central Processing Unit). The control unit 10 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the control unit 10 may be configured as, for example, a CPU and a program executed by the CPU. The control unit 10 may appropriately include a memory required for operations of the control unit 10.

The storage unit 40 may store a program executed in the control unit 10, results of processing performed by the control unit 10, etc. The storage unit 40 may function as a work memory of the control unit 10. The storage unit 40 may be constituted, for example, by a semiconductor memory or a magnetic disk. However, the storage unit 40 is not limited to these, and can be any storage device. The storage unit 40 may be, for example, a storage medium such as a memory card inserted to the electronic device 1 according to the present embodiment. The storage unit 40 may be an internal memory of the CPU used as the control unit 10 as described above.

In the one embodiment, the storage unit 40 may store various parameters for setting a range in which an object is detected on the basis of a transmission wave T transmitted from each transmission antenna 25 and a reflected wave R received from each reception antenna 31.

In the electronic device 1 according to the one embodiment, the control unit 10 is capable of controlling at least one of the transmission unit 20 and the reception units 30. In this case, the control unit 10 may control at least one of the transmission unit 20 and the reception units 30 on the basis of various kinds of information stored in the storage unit 40. In the electronic device 1 according to the one embodiment, the control unit 10 may instruct the signal generating unit 21 to generate a signal or may control the signal generating unit 21 to generate a signal.

In accordance with control performed by the control unit 10, the signal generating unit 21 generates a signal (transmission signal) to be transmitted as the transmission wave T from each of the transmission antennas 25. When generating the transmission signal, the signal generating unit 21 may allocate a frequency of the transmission signal in accordance with control performed by the control unit 10, for example. Specifically, the signal generating unit 21 may allocate a frequency of the transmission signal in accordance with a parameter set by a parameter setting unit 16. For example, the signal generating unit 21 receives frequency information from the control unit 10 (the parameter setting unit 16) and generates a signal having a predetermined frequency in a frequency band such as from 77 GHz to 81 GHz, for example. The signal generating unit 21 may include a functional unit serving as a voltage control oscillator (VCO), for example.

The signal generating unit 21 may be configured as hardware having the function, as for example a microcomputer, or as for example a processor such as a CPU and a program or the like executed by the processor. Each functional unit described below may also be configured as hardware having the function, as for example a microcomputer if possible, or as for example a processor such as a CPU or a program or the like executed by the processor.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. The signal to be generated by the signal generating unit 21 may be set in advance by the control unit 10, for example. The signal generated by the signal generating unit 21 may be stored in advance in the storage unit 40 or the like, for example. Since chirp signals used in a technical field such as a radar are known, more detailed description is appropriately simplified or omitted. The signal generated by the signal generating unit 21 is supplied to the synthesizer 22.

Figure 3:
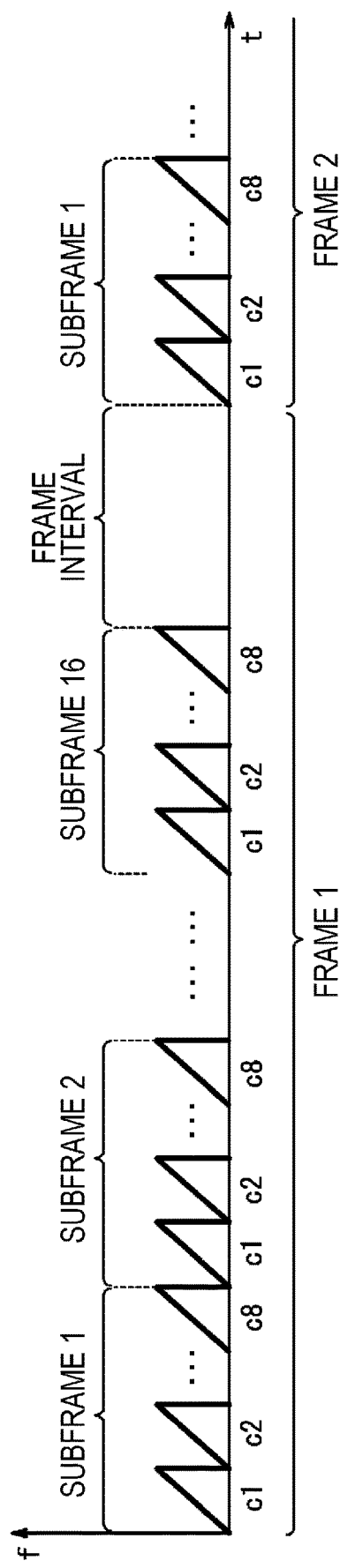
FIG. 3 is a diagram for describing a configuration of a transmission signal according to the one embodiment.

FIG. 3 is a diagram for describing an example of chirp signals generated by the signal generating unit 21.

In FIG. 3, the horizontal axis represents an elapse of time, and the vertical axis represents a frequency. In the example illustrated in FIG. 3, the signal generating unit 21 generates linear chirp signals whose frequency linearly changes periodically. In FIG. 3, the individual chirp signals are denoted by $c_1, c_2, \ldots, c_8$. As illustrated in FIG. 3, the frequency of each chirp signal linearly increases as time elapses.

In the example illustrated in FIG. 3, eight chirp signals $c_1, c_2, \ldots, c_8$ constitute one subframe. That is, each of subframes such as a subframe 1 and a subframe 2 illustrated in FIG. 3 includes eight chirp signals $c_1, c_2, \ldots, c_8$. In the example illustrated in FIG. 3, 16 subframes such as the subframes 1 to 16 constitute one frame. That is, each of frames such as a frame 1 and a frame 2 illustrated in FIG. 3 includes 16 subframes. As illustrated in FIG. 3, a frame interval of a predetermined length may be included between frames. One frame illustrated in FIG. 3 may have a length of about 30 ms to 50 ms, for example.

In FIG. 3, the frame 2 and subsequent frames may have the same and/or similar configuration. In FIG. 3, the frame 3 and subsequent frames may have the same and/or similar configuration. In the electronic device 1 according to the one embodiment, the signal generating unit 21 may generate a transmission signal as any number of frames. In FIG. 3, an illustration of some chirp signals is omitted. As described above, a relationship between time and a frequency of the transmission signal generated by the signal generating unit 21 may be stored in the storage unit 40 or the like, for example.

As described above, the electronic device 1 according to the one embodiment may transmit a transmission signal constituted by subframes each including a plurality of chirp signals. The electronic device 1 according to the one embodiment may transmit a transmission signal constituted by frames each including a predetermined number of subframes.

Description is given below on the assumption that the electronic device 1 transmits a transmission signal having a frame structure illustrated in FIG. 3. However, the frame structure illustrated in FIG. 3 is an example. For example, the number of chirp signals included in one subframe is not limited to eight. In the one embodiment, the signal generating unit 21 may generate a subframe including any number (for example, a plurality) of chirp signals. A subframe structure illustrated in FIG. 3 is an example. For example, the number of subframes included in one frame is not limited to 16. In the one embodiment, the signal generating unit 21 may generate a frame including any number (for example, a plurality) of subframes. The signal generating unit 21 may generate signals having different frequencies. The signal generating unit 21 may generate a plurality of discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. The frequency selected as the frequency of the transmission wave T to be transmitted from each of the transmission antennas 25 may be set by the control unit 10, for example. For example, the frequency selected as the frequency of the transmission wave T to be transmitted from each of the transmission antennas 25 may be a frequency selected by the parameter setting unit 16. The frequency selected as the frequency of the transmission wave T to be transmitted from each of the transmission antennas 25 may be stored in the storage unit 40, for example. The signal whose frequency has been increased by the synthesizer 22 is supplied to the phase control unit 23 and the mixer 33. When the plurality of phase control units 23 are present, the signal whose frequency has been increased by the synthesizer 22 may be supplied to each of the plurality of phase control units 23. When the plurality of reception units 30 are present, the signal whose frequency has been increased by the synthesizer 22 may be supplied to each of the mixers 33 of the plurality of reception units 30.

Each of the phase control units 23 controls a phase of the transmission signal supplied from the synthesizer 22. Specifically, for example, in accordance with control performed by the control unit 10, each of the phase control units 23 may appropriately advance or delay the phase of the signal supplied from the synthesizer 22 to adjust the phase of the transmission signal. In this case, on the basis of a difference between paths of the transmission waves T to be transmitted from the plurality of transmission antennas 25, the phase control units 23 may adjust the phases of the respective transmission signals. The phase control units 23 appropriately adjust the phases of the respective transmission signals. Consequently, the transmission waves T transmitted from the plurality of transmission antennas 25 enhance with each other in a predetermined direction to form a beam (beamforming). In this case, a correlation between a direction of beamforming and amounts of phase by which the respective transmission signals transmitted by the plurality of transmission antennas 25 are controlled may be stored in the storage unit 40, for example. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the control unit 10, for example. When the sensor 5 includes the plurality of transmission antennas 25, each of the plurality of amplifiers 24 may amplify power (electric power) of the transmission signal supplied from a respective one of the plurality of phase control units 23 in accordance with control performed by the control unit 10, for example. Since the technology for amplifying power of a transmission signal is already known, more detailed description is omitted. Each of the amplifiers 24 is connected to a respective one of the transmission antennas 25.

The transmission antenna 25 outputs (transmits), as the transmission wave T, the transmission signal amplified by the amplifier 24. When the sensor 5 includes the plurality of transmission antennas 25, each of the plurality of transmission antennas 25 may output (transmit), as the transmission wave T, the transmission signal amplified by a respective one of the plurality of amplifiers 24. Since the transmission antennas 25 can be configured in a manner that is the same as and/or similar to that of transmission antennas for use in the known radar technology, more detailed description is omitted.

The electronic device 1 according to the one embodiment, which includes the transmission antennas 25, is capable of transmitting transmission signals (for example, transmission chirp signals) as the transmission waves T from the respective transmission antennas 25 in this manner. At least one of the functional units constituting the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The transmission antennas 25 are covered with a member such as the radar cover, so that a risk of the transmission antennas 25 being damaged or malfunctioning because of a contact with an external object can be reduced. The radar cover and the housing may also be referred to as a radome.

FIG. 2 illustrates an example in which the electronic device 1 includes two transmission antennas 25. However, in the one embodiment, the electronic device 1 may include any number of transmission antennas 25. On the other hand, in the one embodiment, the electronic device 1 may include the plurality of transmission antennas 25 in the case where the transmission waves T transmitted from the respective transmission antennas 25 form a beam in a predetermined direction. In the one embodiment, the electronic device 1 may include a plurality of transmission antennas 25. In this case, the electronic device 1 may include the plurality of phase control units 23 and the plurality of amplifiers 24 to correspond to the plurality of transmission antennas 25. Each of the plurality of phase control units 23 may control the phase of a respective one of the plurality of transmission waves supplied from the synthesizer 22 and to be transmitted from the plurality of transmission antennas 25. Each of the plurality of amplifiers 24 may amplify power of a respective one of the plurality of transmission signals to be transmitted from the plurality of transmission antennas 25. In this case, the sensor 5 may include the plurality of transmission antennas. As described above, when the electronic device 1 illustrated FIG. 2 includes the plurality of transmission antennas 25, the electronic device 1 may include a plurality of functional units necessary for transmitting the transmission waves T from the plurality of transmission antennas 25.

The reception antenna 31 receives the reflected wave R. The reflected wave R is the transmission wave T reflected off the predetermined object 200. As the reception antenna 31, a plurality of antennas such as the reception antennas 31A to 31D, for example, may be included. Since the reception antennas 31 can be configured in a manner that is the same as and/or similar to that of reception antennas for use in the known radar technology, more detailed description is omitted. Each of the reception antennas 31 is connected to the LNA 32. A reception signal based on the reflected wave R received by each of the reception antennas 31 is supplied to the LNA 32.

The electronic device 1 according to the one embodiment can receive, from each of the plurality of reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The reception antennas 31 are covered with a member such as the radar cover, so that a risk of the reception antennas 31 being damaged or malfunctioning because of a contact with an external object can be reduced. The radar cover and the housing may also be referred to as a radome.

When the reception antennas 31 are installed near the transmission antennas 25, these may be collectively included in one sensor 5. That is, for example, one sensor 5 may include at least one transmission antenna 25 and at least one reception antenna 31. For example, one sensor 5 may include the plurality of transmission antennas 25 and the plurality of reception antennas 31. In such a case, one radar sensor may be covered with a cover member such as one radar cover, for example.

The LNA 32 amplifies, with low noise, the reception signal based on the reflected wave R received by a respective one of the reception antennas 31. The LNA 32 may be a low-noise amplifier and amplifies, with low noise, the reception signal supplied from a respective one of the reception antennas 31. The reception signal amplified by the LNA 32 is supplied to the mixer 33.

The mixer 33 mixes (multiplies) the reception signal having a radio frequency (RF) supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to reduce the frequency of the beat signal to an intermediate frequency (IF). The beat signal whose frequency has been reduced by the IF unit 34 is supplied to the AD conversion unit 35.

The AD conversion unit 35 digitizes the analog beat signal supplied from the IF unit 34. The AD conversion unit 35 may be constituted by any analog-to-digital conversion circuit (Analog to Digital Converter (ADC)). The digitized beat signal obtained by the AD conversion unit 35 is supplied to the distance FFT processing unit 11 of the control unit 10. In the case where there are the plurality of reception units 30, the beat signals each digitized by a respective one of the plurality of AD conversion units 35 may be supplied to the distance FFT processing unit 11.

The distance FFT processing unit 11 estimates a distance between the mobility device 100 equipped with the electronic device 1 and the object 200 on the basis of the beat signals supplied from the respective AD conversion units 35. The distance FFT processing unit 11 may include a processing unit that performs fast Fourier transform, for example. In this case, the distance FFT processing unit 11 may be configured as any circuit, any chip, or the like that performs fast Fourier transform (FFT).

The distance FFT processing unit 11 performs FFT processing (hereinafter, appropriately referred to as "distance FFT processing") on the beat signal that has been digitized by each of the AD conversion units 35. For example, the distance FFT processing unit 11 may perform the FFT processing on a complex signal supplied from each of the AD conversion units 35. The beat signal that has been digitized by each of the AD conversion units 35 can be represented as a temporal change in signal intensity (power). The distance FFT processing unit 11 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, there is known a method for determining that an object (reflecting object) that reflects a transmission wave is present when a peak value that is equal to or greater than a threshold is detected from the average power or amplitude of a disturbance signal as in constant false alarm rate (CFAR)-based detection processing.

As described above, the electronic device 1 according to the one embodiment can detect, as the target, the object 200 that reflects the transmission wave T, based on the transmission signal transmitted as the transmission wave T and the reception signal received as the reflected wave R.

The distance FFT processing unit 11 can estimate a distance to the predetermined object on the basis of one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. Results (for example, distance information) of the distance FFT processing performed by the distance FFT processing unit 11 may be supplied to the velocity FFT processing unit 12. The results of the distance FFT processing performed by the distance FFT processing unit 11 may also be supplied to the distance-velocity detection determining unit 13 and/or the object detecting unit 15.

The velocity FFT processing unit 12 estimates a relative velocity between the mobility device 100 equipped with the electronic device 1 and the object 200 on the basis of the beat signals on which the distance FFT processing has been performed by the distance FFT processing unit 11. The velocity FFT processing unit 12 may include a processing unit that performs fast Fourier transform, for example. In this case, the velocity FFT processing unit 12 may be configured as any circuit, any chip, or the like that performs fast Fourier transform (FFT) processing.

The velocity FFT processing unit 12 further performs FFT processing (hereinafter, appropriately referred to as "velocity FFT processing") on each beat signal on which the distance FFT processing has been performed by the distance FFT processing unit 11. For example, the velocity FFT processing unit 12 may perform the FFT processing on each complex signal supplied from the distance FFT processing unit 11. The velocity FFT processing unit 12 can estimate a relative velocity to the predetermined object on the basis of a subframe (for example, the subframe 1 illustrated in FIG. 3) including chirp signals. When the distance FFT processing is performed on the beat signal in the above-described manner, a plurality of vectors can be generated. The velocity FFT processing unit 12 can estimate a relative velocity to the predetermined object by determining a phase of a peak in a result of the velocity FFT processing performed on the plurality of vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted. Results (for example, velocity information) of the velocity FFT processing performed by the velocity FFT processing unit 12 may be supplied to the angle-of-arrival estimating unit 14. The results of the velocity FFT processing performed by the velocity FFT processing unit 12 may also be supplied to the distance-velocity detection determining unit 13 and/or the object detecting unit 15.

The distance-velocity detection determining unit 13 performs determination processing for a distance and/or a relative velocity on the basis of the results of the distance FFT processing performed by the distance FFT processing unit 11 and/or the results of the velocity FFT processing performed by the velocity FFT processing unit 12. The distance-velocity detection determining unit 13 determines whether the target is detected at a predetermined distance and/or a predetermined relative velocity. The distance-velocity detection determining unit 13 is further described below.

The angle-of-arrival estimating unit 14 estimates a direction from which the reflected wave R arrives from the predetermined object 200 on the basis of the result of the velocity FFT processing performed by the velocity FFT processing unit 12. The electronic device 1 can estimate the direction from which the reflected wave R arrives, by receiving the reflected wave R from the plurality of reception antennas 31. For example, the plurality of reception antennas 31 are arranged at a predetermined interval. In this case, the transmission wave T transmitted from each of the transmission antennas 25 is reflected off the predetermined object 200 to become the reflected wave R. Each of the plurality of reception antennas 31 arranged at the predetermined interval receives the reflected wave R. The angle-of-arrival estimating unit 14 can estimate the direction from which the reflected wave R arrives at each of the plurality of reception antennas 31 on the basis of the phase of the reflected wave R received by the reception antenna 31 and a difference in path of the reflected wave R. That is, the electronic device 1 can measure (estimate) the angle of arrival θ illustrated in FIG. 1 on the basis of the results of the velocity FFT processing.

Various techniques for estimating a direction from which the reflected wave R arrives on the basis of a result of velocity FFT processing have been proposed. For example, MUSIC (MUltiple SIgnal Classification), ESPRIT (Estimation of Signal Parameters via Rotational Invariance Technique), and the like are known as known arriving direction estimation algorithms. Thus, more detailed description of the known techniques is appropriately simplified or omitted. Information (angle information) on the angle of arrival θ estimated by the angle-of-arrival estimating unit 14 may be supplied to the object detecting unit 15.

The object detecting unit 15 detects an object located in a range in which the transmission wave T is transmitted, on the basis of the information supplied from at least any of the distance FFT processing unit 11, the velocity FFT processing unit 12, and the angle-of-arrival estimating unit 14. The object detecting unit 15 may perform detection of an object by performing, for example, clustering processing on the basis of the supplied distance information, velocity information, and angle information. For example, DBSCAN (Density-based spatial clustering of applications with noise) or the like is known as an algorithm used in clustering of data. In the clustering processing, for example, average power of points constituting the detected object may be calculated. The distance information, the velocity information, the angle information, and power information of the object detected by the object detecting unit 15 may be supplied to a detection range determining unit 15. The distance information, the velocity information, the angle information, and the power information of the object detected by the object detecting unit 15 may be supplied to the ECU 50. In this case, when the mobility device 100 is an automobile, communication may be performed using a communication interface such as a CAN (Controller Area Network), for example.

The ECU 50 included in the electronic device 1 according to the one embodiment is capable of controlling the functional units of the mobility device 100 and also controlling operations of the entire mobility device 100. To provide control and processing capabilities for executing various functions, the ECU 50 may include at least one processor, for example, a CPU (Central Processing Unit). The ECU 50 may be collectively implemented by one processor, may be implemented by some processors, or may be implemented discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the ECU 50 may be configured as, for example, a CPU and a program executed by the CPU. The ECU 50 may appropriately include a memory required for operations of the ECU 50. At least part of the functions of the control unit 10 may be functions of the ECU 50, or at least part of the functions of the ECU 50 may be functions of the control unit 10.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, by including the two transmission antennas 25 and the four reception antennas 31, the electronic device 1 can be regarded to include a virtual antenna array that is virtually constituted by eight antennas. As described above, the electronic device 1 may receive the reflected wave R of 16 subframes illustrated in FIG. 3 by using, for example, the eight virtual antennas.

Target detection processing performed by the electronic device 1 according to the one embodiment is described next.

As described above, the electronic device 1 according to the one embodiment transmits transmission waves from the transmission antennas and receives, from the reception antennas, reflected waves that are the transmission waves reflected off an object serving as a target and/or clutter. The electronic device 1 according to the one embodiment may detect, as the target, the object that reflects the transmission waves, on the basis of the transmission signal and/or the reception signal.

In a common FM-CW radar technology, whether a target is present can be determined on the basis of a result of fast Fourier transform processing or the like performed on a beat frequency extracted from a reception signal. The result of the fast Fourier transform processing or the like performed on the beat frequency extracted from the reception signal includes a noise component due to clutter (extraneous reflection component) or the like. Thus, processing for removing the noise component from the processing result of the reception signal and extracting a target signal alone may be performed.

As a technique for determining whether the target is present, there is a scheme (threshold detection scheme) for setting a threshold for output of the reception signal and assumes that the target is present if the intensity of a reflected signal exceeds the threshold. When this scheme is employed, the target is determined also when the signal intensity of clutter exceeds the threshold. Consequently, a so-called "false alarm" is issued. Whether the signal intensity of this clutter exceeds the threshold is a matter of a probability. The probability of the signal intensity of this clutter exceeding the threshold is called "a probability of false alarm". As a technique for suppressing this probability of false alarm to be low and constant, the constant false alarm rate can be used.

Hereinafter, the constant false alarm rate is also simply referred to as CFAR. CFAR employs an assumption that the signal intensity (amplitude) of noise conforms to a Rayleigh distribution. Based on this assumption, if a weight for use in calculation of a threshold for use in determining whether a target is detected is fixed, an error rate in detection of the target becomes theoretically constant regardless of the amplitude of noise.

As CFAR in the common radar technology, a scheme called Cell-Averaging CFAR (hereinafter, also referred to as CA-CFAR) is known. In CA-CFAR, a signal intensity value (for example, an amplitude value) of the reception signal having undergone predetermined processing may be sequentially input to a shift register at a constant sampling frequency. This shift register has a cell under test at the center and has a plurality of reference cells on both sides of the cell under test. Every time the signal intensity value is input to the shift register, each signal intensity value input previously is moved from a cell on one end side (for example, a left end side) to a cell on the other end side (for example, a right end side) of the shift register by one. In synchronization with the input timing, the values in the reference cells are averaged. The average value thus obtained is multiplied by a prescribed weight, and the result is calculated as a threshold. If the value in the cell under test is greater than the threshold thus calculated, the value in the cell under test is output. On the other hand, if the value in the cell under test is not greater than the calculated threshold, a value of 0 is output. As described above, in CA-CFAR, the threshold is calculated from the average of the values in the reference cells and whether a target is present is determined. In this manner, a detection result can be obtained.

In CA-CFAR, for example, when a plurality of targets are present in the vicinity to each other, the threshold calculated in the vicinity of the targets increases because of the nature of the algorithm. Thus, a target may not be detected regardless of the sufficient signal intensity. Likewise, when there is a clutter step, the calculated threshold increases also in the vicinity of the clutter step. Also in this case, a small target located in the vicinity of the clutter step may not be detected.

In relation to CA-CFAR described above, there is a technique called Order Statistic CFAR (hereinafter, also referred to as OS-CFAR) as a technique for obtaining a threshold from the median of the values in the reference cells or from a value at a prescribed place in order of the values in the reference cells sorted in ascending order. OS-CFER is a technique for setting a threshold on the basis of ordered statistics and determining that a target is present if the signal intensity exceeds the threshold. This OS-CFAR can cope with the above-described issues in CA-CFAR. OS-CFAR can be implemented by performing processing that is partially different from that of CA-CFAR.

An example in which the electronic device 1 according to the one embodiment performs OS-CFAR processing is further described below.

In the electronic device 1 according to the one embodiment, for example, the distance-velocity detection determining unit 13 of the control unit 10 illustrated in FIG. 2 may perform the OS-CFAR processing. In the electronic device 1 according to the one embodiment, for example, the distance FFT processing unit 11 and/or the velocity FFT processing unit 12 of the control unit 10 illustrated in FIG. 2 may perform the OS-CFAR processing. An example in which the distance-velocity detection determining unit 13 performs the OS-CFAR processing is described below with reference to FIG. 4.

As described in FIG. 2, in the electronic device 1 according to the one embodiment, the frequency of the chirp signal generated by the signal generating unit 21 is increased by the synthesizer 22 to the frequency in the selected frequency band. The frequency-increased chirp signal is transmitted from the transmission antennas 25 through the phase control units 23 and the amplifiers 24. The chirp signal reflected off a reflecting object passes through the reception antenna 31 and the LNA 32 and is multiplied by the transmission signal in the mixer 33, and is received by the AD conversion unit 35 through the IF unit 34. The distance FFT processing unit 11 performs the distance FFT processing on the complex signal received by the AD conversion unit 35.

Figure 4:
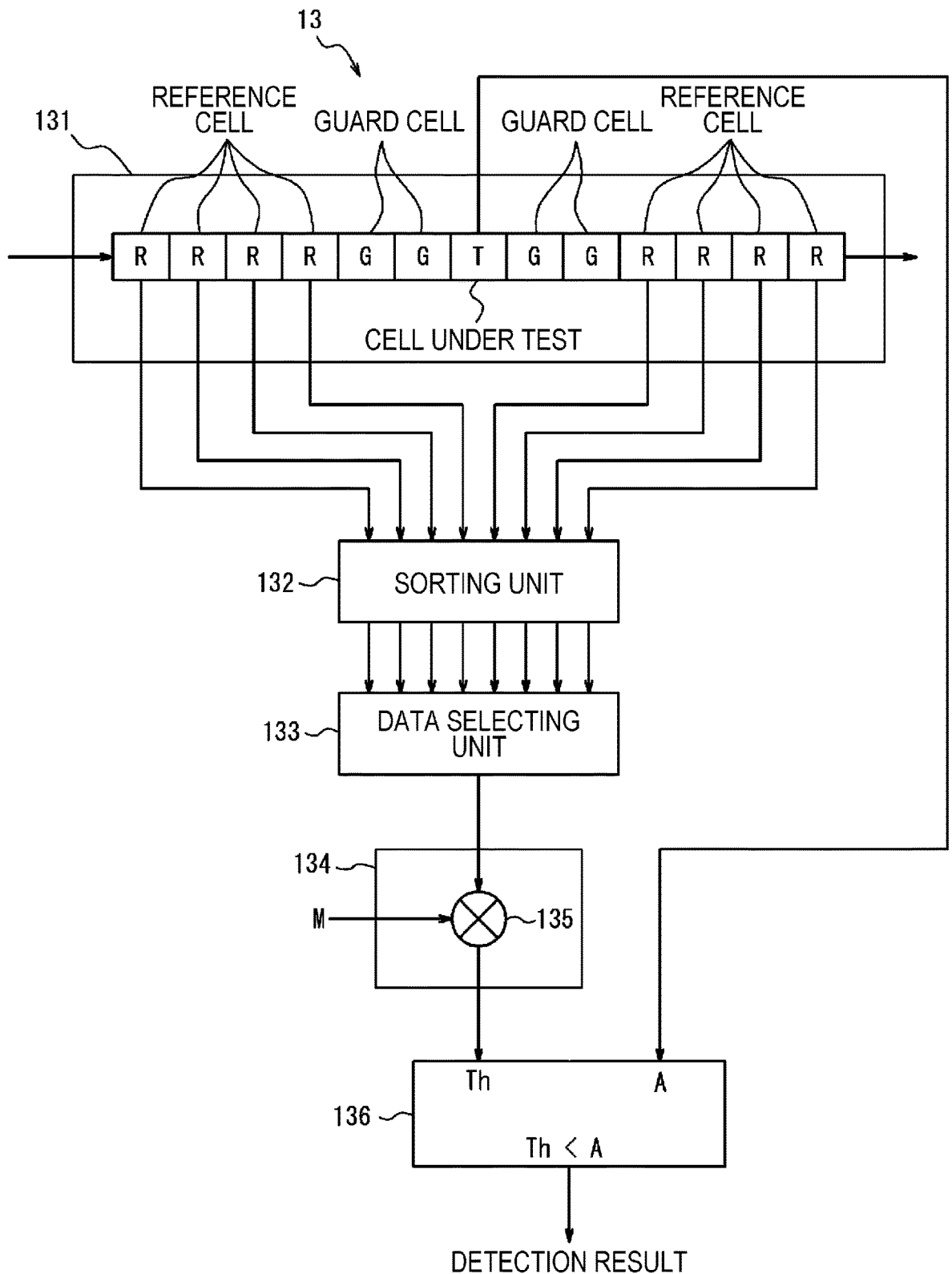
FIG. 4 is a diagram for describing processing blocks in a control unit according to the one embodiment.

In the one embodiment, the distance-velocity detection determining unit 13 may perform the OS-CFAR processing on the signal having undergone the distance FFT processing. FIG. 4 is a block diagram for describing processing performed by the control unit 10 of the electronic device 1 according to the one embodiment. More specifically, FIG. 4 is a diagram for describing an example of a logic of circuitry that performs the OS-CFAR processing in the distance-velocity detection determining unit 13 of the control unit 10. To perform the OS-CFAR processing, the distance-velocity detection determining unit 13 may include a shift register 131, a sorting unit 132, a data selecting unit 133, a threshold calculating unit 134, a weight setting unit 135, and a detection determining unit 136 as illustrated in FIG. 4.

In OS-CFAR, as in the case of CA-CFAR, the signal intensity value of the reception signal having undergone predetermined processing may be sequentially input to the shift register 131 at a constant sampling frequency. Every time the signal intensity value is input to the shift register 131, each signal intensity value input previously is moved from a cell on one end side (for example, a left end side) to a cell on the other end side (for example, a right end side) of the shift register 131 by one. As described above, in the one embodiment, the shift register 131 (of the distance-velocity detection determining unit 13) may shift the signal intensity based on the reception signal input from one end at a predetermined sampling frequency toward the other end in a first-in first-out manner.

As illustrated in FIG. 4, the shift register 131 may have a cell under test T in a test region at the center. Hereinafter, a region in which the cell under test T is arranged may also be referred to as a "test region". The shift register 131 may also have guard cells G in guard regions on both sides of the cell under test T. FIG. 4 illustrates the guard cells G as two contiguous cells. However, the number of guard cells G may be any number. Hereinafter, a region in which the guard cell G is arranged may also be referred to as a "guard region". The shift register 131 further has a plurality of reference cells R in reference regions on the respective outer sides of the guard cells G. FIG. 4 illustrates the reference cells R as four contiguous cells. However, the number of reference cells R may be any number. Hereinafter, a region in which the reference cell R is arranged may also be referred to as a "reference region". As described above, in the one embodiment, the control unit 10 (the shift register 131 of the distance-velocity detection determining unit 13) may establish the guard region between the test region and the reference region in the distance direction. As described above, in the one embodiment, the shift register 131 may include the cell under test T in the test region and the reference cell R in the reference region.

The sorting unit 132 sorts values output from the respective reference cells R in ascending order. The sorting unit 132 may be constituted by, for example, any sorting circuit or the like. The sorting unit 132 may sort the values in the reference cells R in ascending order, in synchronization with a timing at which the signal intensity is input to the shift register 131. As described above, in the one embodiment, the control unit 10 (the distance-velocity detection determining unit 13) may include the sorting unit 132 that sorts, in ascending order, signal intensities output from the reference cells R of the shift register 131.

The data selecting unit 133 may select and extract a value at a prescribed position (for example, at a predetermined place in order from the smallest) from among the values sorted by the sorting unit 132. As described above, in the one embodiment, the control unit 10 (the distance-velocity detection determining unit 13) may include the data selecting unit 133 that selects a signal intensity at a predetermined place in order from among the signal intensities sorted by the sorting unit 132.

The threshold calculating unit 134 may calculate a threshold Th by multiplying the value selected by the data selecting unit 133 by a prescribed weight. In this case, the weight setting unit 135 may calculate the threshold Th by multiplying the value selected by the data selecting unit 133 by, for example, a prescribed weight M. As described above, in the one embodiment, the control unit 10 (the distance-velocity detection determining unit 13) may include the threshold calculating unit 134 that sets a threshold for use in detection of the target, based on the signal intensity selected by the data selecting unit 133.

The detection determining unit 136 compares a magnitude of a signal intensity value A in the cell under test T with the threshold Th calculated by the threshold calculating unit 134. If the signal intensity value A in the cell under test T is greater than the threshold Th, the detection determining unit 136 outputs, as a detection result, the signal intensity value A in the cell under test T. On the other hand, if the signal intensity value A in the cell under test T is not greater than the threshold Th, the detection determining unit 136 outputs zero as the detection result. As described above, in the one embodiment, the control unit 10 (the detection determining unit 136 of the distance-velocity detection determining unit 13) may determine whether a target is present, based on the signal intensity A in the cell under test T in the test region and the threshold Th.

In OS-CFAR, the threshold is calculated from the value at a prescribed position (for example, at a predetermined place in order from the smallest) among the sorted signal intensities. Thus, an influence of a signal based on a reflected wave on calculation of the threshold may be suppressed. Therefore, with OS-CFAR, an increase in the threshold may be suppressed in the vicinity of the targets. In addition, with OS-CFAR, an increase in the threshold may be suppressed in the vicinity of the clutter step.

Figure 5:
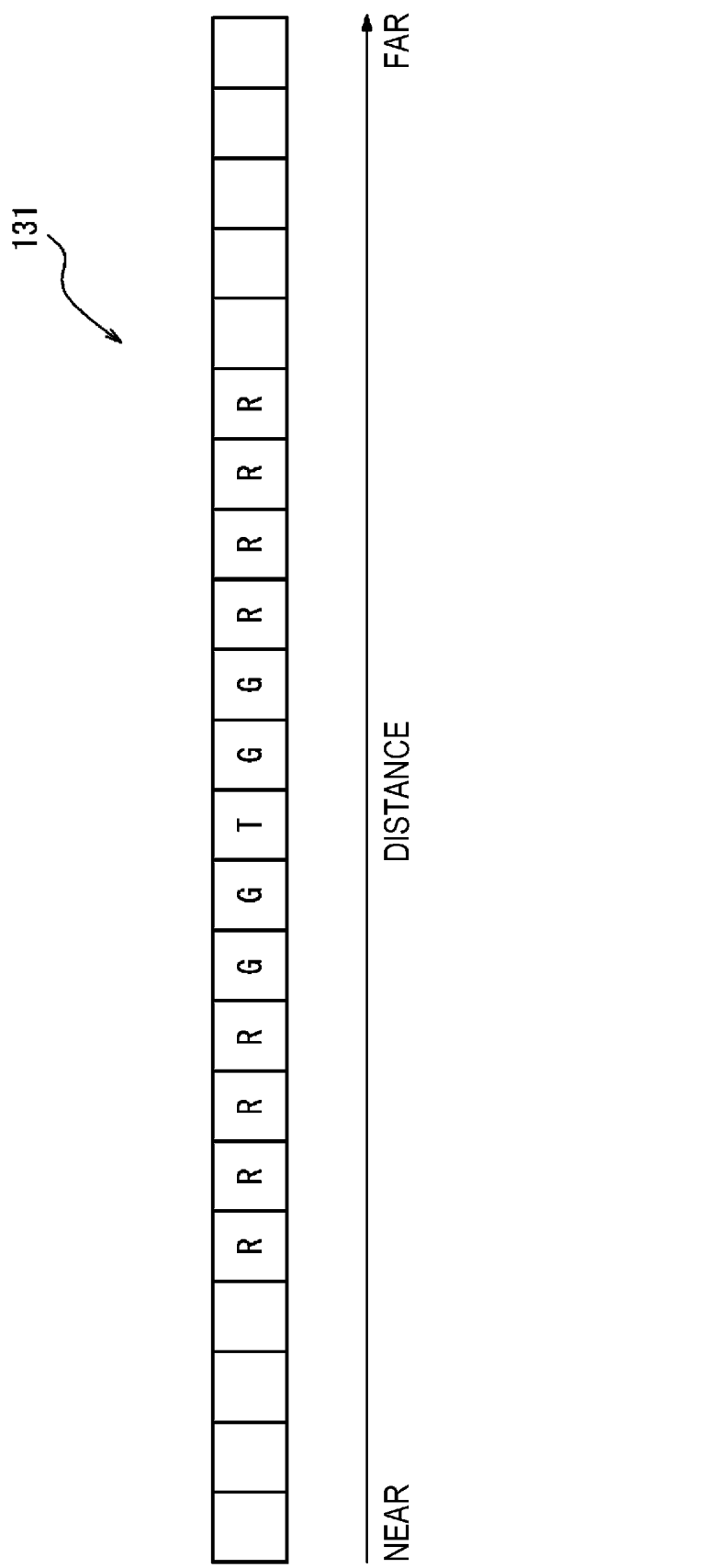
FIG. 5 is a diagram for describing an example in which the electronic device according to the one embodiment performs OS-CFER processing.

In the electronic device 1 according to the one embodiment, the distance FFT processing unit 11 performs distance FFT processing on the beat signal digitized by the AD conversion unit 35. Consequently, a distribution of the signal intensities (powers) in the distance direction is obtained. In this case, as illustrated in FIG. 5, the right side in the shift register 131 may correspond to a distance far from the sensor 5 of the electronic device 1. In addition, the left side in the shift register 131 may correspond to a distance near the sensor 5 of the electronic device 1. FIG. 5 is a diagram for describing an example in which the electronic device 1 according to the one embodiment performs the OS-CFER processing. In FIG. 5, the cell under test T, the guard cells G, and the reference cells R are arranged in the same manner as in the example illustrated in FIG. 4.

By using OS-CFAR described above, the electronic device 1 according to the one embodiment can determine detection of a distance. That is, the control unit 10 of the electronic device 1 according to the one embodiment calculates a distance threshold Th on the basis of a value at a predetermined place in order (for example, K-th) from the lowest among signal intensities (powers) in the reference cells R. The control unit 10 of the electronic device 1 according to the one embodiment can determine that the target is present in the test region if the signal intensity value A in the cell under test T is greater than the distance threshold Th.

Figure 6:
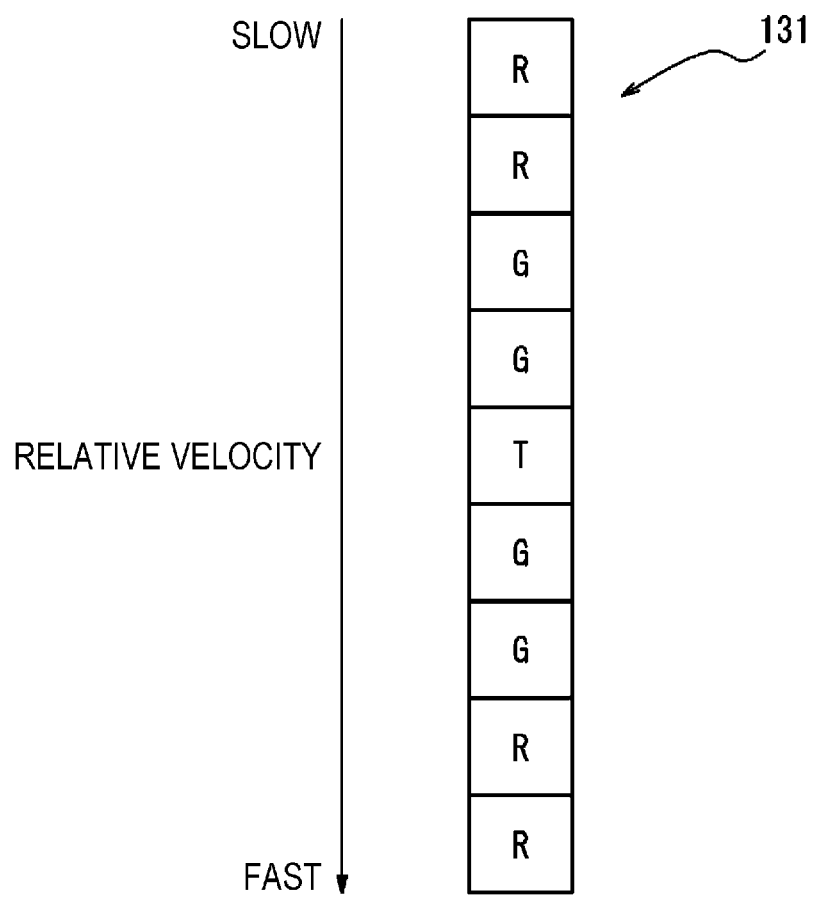
FIG. 6 is a diagram for describing the example in which the electronic device according to the one embodiment performs the OS-CFER processing.

At the distance at which the target is determined to be present in this manner, the velocity FFT processing unit 12 of the control unit 10 may perform velocity FFT processing on the plurality of chirp signals. Similarly to the distance FFT processing unit 11 described above, the velocity FFT processing unit 12 may also determine detection of a velocity. In this case, as illustrated in FIG. 6, the lower side in the shift register 131 may correspond to a region where the relative velocity between the sensor 5 of the electronic device 1 and the target is fast. In addition, as illustrated in FIG. 6, the upper side in the shift register 131 may correspond to a region where the relative velocity between the sensor 5 of the electronic device 1 and the target is slow. FIG. 6 is a diagram for describing the example in which the electronic device 1 according to the one embodiment performs the OS-CFER processing. The cell under test T, the guard cells G, and the reference cells R are arranged also in FIG. 6. The arrangement illustrated in FIG. 6 is an example. As described above, the electronic device 1 according to the one embodiment can determine detection of a velocity by using the constant false alarm rate in the velocity direction.

In the shift register 131 illustrated in FIG. 5, the plurality of reference cells R are contiguously arranged on both sides of the test region in the distance direction. In OS-CFAR, if the reference cells R are arranged in the shift register 131 as illustrated in FIG. 5, it is anticipated that the target is not correctly detected depending on the circumstances.

For example, suppose that, in a circumstance in which a vehicle of interest equipped with an on-vehicle radar is traveling on an expressway, another vehicle or the like located around the vehicle of interest is to be detected by using the on-vehicle radar. Suppose that, for example, an object such as an iron fence is installed over a long distance without interruption along a lane in which the vehicle of interest is traveling. In such an environment, an interval between the object such as the iron fence installed along the lane and the vehicle of interest (a distance in the width direction of the vehicle of interest) is maintained substantially constant during traveling. In this case, the signal intensity based on a reflected wave from the large (long) interfering object (iron fence) is continuously detected in the distance direction in the reference regions (reference cells R) of the shift register 131. Thus, the on-vehicle radar is expectedly able to detect the iron fence as the target. However, suppose that, for example, another vehicle or the like is traveling in a lane that is along the iron fence.

In such a case, even if an attempt to detect, as the target, the vehicle or the like traveling along the iron fence is made, the reference regions in which the reference cells R are arranged become regions corresponding to the signal intensities based on the reflected wave from the iron fence. In such a circumstance, the signal intensity value A in the cell under test T in the test region no longer exceeds the threshold Th because of increased noise power. Thus, the on-vehicle radar expectedly fails to detect the vehicle as the target.

In addition, the signal intensity (power) based on the reflected wave tends to increase as the distance from the radar decreases. Thus, if the near side with respect to the target is referred to, the signal intensity value A in the cell under test T in the test region no longer exceeds the threshold Th because of increased noise power. Also in such a case, the on-vehicle radar expectedly fails to detect the object as the target.

To cope with such a circumstance, the electronic device 1 according to the one embodiment two-dimensionally arranges the reference regions (reference cells R) in the shift register 131. The electronic device 1 according to the one embodiment also changes the arrangement of the reference regions (reference cells R) in the shift register 131 configured two-dimensionally. The following description is given on the assumption that the electronic device 1 according to the one embodiment detects the target by using the constant false alarm rate.

FIG. 7 is a diagram illustrating an example of the two-dimensional arrangement of the reference regions (reference cells R) in the shift register 131 of the electronic device 1 according to the one embodiment. The cell under test T, the guard cells G, and the reference cells R are arranged also in FIG. 7. The arrangement illustrated in FIG. 7 is an example. As in FIG. 5, in FIG. 7, the right side in the shift register 131 corresponds to the distance far from the sensor 5 of the electronic device 1 and the left side in the shift register 131 corresponds to the distance near the sensor 5 of the electronic device 1. As in FIG. 6, in FIG. 7, the lower side in the shift register 131 corresponds to the region where the relative velocity to the sensor 5 of the electronic device 1 is fast and the upper side in the shift register 131 corresponds to the region where the relative velocity to the sensor 5 of the electronic device 1 is slow. In the shift register 131 of the distance-velocity detection determining unit 13 illustrated in FIG. 4, the reference regions (reference cells R) are arranged one-dimensionally in the distance direction alone. In contrast, in the one embodiment, in the shift register 131 of the distance-velocity detection determining unit 13, the reference regions (reference cells R) may be arranged two-dimensionally in the distance direction and the velocity direction. As described above, in the electronic device 1 according to the one embodiment, (the distance-velocity detection determining unit 13 of) the control unit 10 may include the shift register 131 that is two-dimensional in the distance direction and the relative velocity direction and that includes the cell under test T in the test region and the reference cells R in the reference regions.

As described above, the distance FFT processing 11 may perform distance Fourier transform on the plurality of chirp signals. In addition, the velocity FFT processing unit 12 may further perform velocity Fourier transform on the signals on which the distance Fourier transform has been performed by the distance FFT processing 11. Thus, the distance-velocity detection determining unit 13 may simultaneously determine detection of the distance and detection of the velocity on the basis of the result of the velocity Fourier transform further performed on the signals obtained by performing the distance Fourier transform on the plurality of chirp signals.

As illustrated in FIG. 7, in the shift register 131 of the electronic device 1 according to the one embodiment, the reference regions (reference cells R) are arranged on the far side with respect to the test region (cell under test T) in the distance direction. That is, in the shift register 131 of the electronic device 1 according to the one embodiment, the reference regions need not be arranged on the near side with respect to the test region in the distance direction. In the shift register 131 illustrated in FIG. 7, no reference regions are arranged in regions corresponding to the near distance, and the reference regions are arranged in regions corresponding to the far distance.

As illustrated in FIG. 7, in the shift register 131 of the electronic device 1 according to the one embodiment, the reference regions (reference cells R) may be arranged non-contiguously in the distance direction. That is, in the shift register 131 of the electronic device 1 according to the one embodiment, the reference cells R may be arranged in a non-contiguous manner in the distance direction. In the shift register 131 illustrated in FIG. 7, the reference cells R are arranged non-contiguously in the distance direction without succession. In the example illustrated in FIG. 7, eight reference cells R are arranged non-contiguously in the distance direction. However, the number of arranged reference cells R may be any number depending on the manner of detecting the target or the required accuracy, for example. In the example illustrated in FIG. 7, the reference cells R are arranged on every other line in the distance direction. However, the intervals at which the reference cells R are arranged non-contiguously in the distance direction may be any intervals depending on the manner of detecting the target or the required accuracy, for example. The intervals at which the reference cells R are arranged may be any intervals, and the intervals at which the reference cells R arranged may be equal intervals or intervals different for the respective reference cells.

As illustrated in FIG. 7, in the shift register 131 of the electronic device 1 according to the one embodiment, the reference regions (reference cells R) may be arranged non-contiguously also in the velocity direction. That is, in the shift register 131 of the electronic device 1 according to the one embodiment, the reference cells R may be arranged in a non-contiguous manner also in the velocity direction. In the shift register 131 illustrated in FIG. 7, the reference cells R are arranged non-contiguously in the velocity direction without succession. In the example illustrated in FIG. 7, eight reference cells R are arranged non-contiguously in the velocity direction. However, the number of arranged reference cells R may be any number depending on the manner of detecting the target or the required accuracy, for example. In the example illustrated in FIG. 7, the reference cells R are arranged on every other line in the velocity direction. However, the intervals at which the reference cells R are arranged non-contiguously in the velocity direction may be any intervals depending on the manner of detecting the target or the required accuracy, for example.

As illustrated in FIG. 7, as in the case of FIG. 5, the shift register 131 may have the guard cells G in the respective guard regions on both sides of the cell under test T in the distance direction. The shift register 131 may have guard cells G in the respective guard regions on both sides of the cell under test T also in the velocity direction. As described above, a guard region (guard cell G) may be established around the test region (cell under test T) in (the shift register 131 of the distance-velocity detection determining unit 13 of) the control unit 10. In the one embodiment, a guard region (guard cell G) may be established around the test region (cell under test T) to be adjacent to the test region (cell under test T) in (the shift register 131 of the distance-velocity detection determining unit 13 of) the control unit 10. FIG. 7 illustrates the guard cells G as two contiguous cells in both the distance direction and the velocity direction. However, the number of guard cells G may be any number. For example, the number of guard cells G may be different numbers between the distance direction and the velocity direction. The number of guard cells G may be different numbers of cells on both sides of the cell under test T in at least one of the distance direction and the velocity direction.

After the electronic device 1 according to the one embodiment arranges the reference regions in the above-described manner, the electronic device 1 according to the one embodiment can determine detection of a velocity by using OS-CFAR described above. That is, the control unit 10 of the electronic device 1 according to the one embodiment calculates a velocity threshold Th on the basis of the value at a predetermined place in order (for example, K-th) from the lowest among signal intensities (powers) in the reference cells R. The control unit 10 of the electronic device 1 according to the one embodiment can determine that the target is present in the test region if the signal intensity value A in the cell under test T is greater than the velocity threshold Th.

In this manner, the electronic device 1 according to the one embodiment can determine detection of a distance and a velocity by using the constant false alarm rate.

Further, in the electronic device 1 according to the one embodiment, the angle-of-arrival estimating unit 14 may estimate a direction from which the reflected wave arrives on the basis of complex signals received by the plurality of reception antennas 31, at the velocity at which the target is determined to be present. As described above, the electronic device 1 according to the one embodiment can estimate an angle for the direction in which the target is present.

In the electronic device 1 according to the one embodiment, the object detecting unit 15 determines whether an object is detected (for example, by clustering) as the target on the basis of the information on the direction (angle) from which the reflected wave arrives, the information on the relative velocity to the target, and/or the information on the distance to the target. The information on the direction (angle) from which the reflected wave arrives may be acquired from the angle-of-arrival estimating unit 14. The information on the relative velocity and the distance to the target may be acquired from the distance-velocity detection determining unit 13. The information on the relative velocity to the target may be acquired from the velocity FFT processing unit 12. The information on the distance to the target may be acquired from the distance FFT processing unit 11. The object detecting unit 15 may calculate average power at points constituting the object detected as the target.

As described above, in the electronic device 1 according to the one embodiment, the control unit 10 detects the target by using the constant false alarm rate, based on the transmission signal transmitted as the transmission wave and the reception signal received as the reflected wave. In this case, the control unit 10 establishes reference regions (reference cells R) non-contiguously in the relative velocity direction and on the far side in the distance direction with respect to the test region in the two-dimensional distribution of signal intensities based on the reception signal in the distance direction and the relative velocity direction. In this case, the control unit 10 may establish the reference regions non-contiguously in the two-dimensional distribution of the signal intensities, which are based on the reception signal and on which at least one of distance Fourier transform processing and velocity Fourier transform processing has been performed, in the distance direction and the relative velocity direction. The control unit 10 also sets the threshold Th for use in detection of the target, based on an order statistic among the signal intensities in the reference regions (reference cells R). Note that the control unit 10 may establish the reference regions (reference cells R) non-contiguously by using the relative velocity direction and at least one of the far side and the near side in the distance direction with respect to the test region in the two-dimensional distribution of the signal intensities based on the reception signal in the distance direction and the relative velocity direction.

As described above, the electronic device 1 according to the one embodiment arranges the reference regions (reference cells R) of noise to be far from the test region (T) of the target object in the distance direction. In the one embodiment, the reference regions (reference cells R) are arranged non-contiguously in the distance direction. Further, in the one embodiment, the reference regions (reference cells R) are arranged non-contiguously also in the velocity direction. That is, the electronic device 1 according to the one embodiment arranges the reference regions (reference cells R) non-contiguously in the velocity direction and on the far side in the distance direction, for the result obtained by performing the distance FFT processing and then the velocity FFT processing on the plurality of chirp signals. Consequently, even if the electronic device 1 according to the one embodiment receives a reflected wave from a relatively large (long) interfering object from which an interval to a vehicle of interest equipped with an on-vehicle radar, for example, is maintained constant during traveling, the electronic device 1 can detect noise power so that the interfering object is removed. For example, even if there is interference caused by a large (long) object in the distance direction at a predetermined relative velocity to a vehicle of interest or the like, the electronic device 1 according to the one embodiment can detect the detection-target object. Thus, the electronic device 1 according to the one embodiment can improve the target detection accuracy.

For example, even in an environment in which an iron fence or the like is installed over a long distance along a lane in which a vehicle of interest is traveling as in the above-described assumed example, the electronic device 1 according to the one embodiment detects noise in regions with a different relative velocity. Thus, the electronic device 1 according to the one embodiment can also detect another vehicle or the like that is traveling in a lane that is along the aforementioned iron fence, for example. Therefore, the electronic device 1 according to the one embodiment can improve the target detection accuracy.

While the present disclosure has been described on the basis of the various drawings and the embodiments, it should be noted that a person skilled in the art can easily make various variations or corrections on the basis of the present disclosure. Therefore, it should be noted that these variations or corrections are within the scope of the present disclosure. For example, functions and the like included in each functional unit can be rearranged without any logical contradiction. A plurality of functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure on the basis of the present disclosure. Accordingly, these variations and corrections are within the scope of the present disclosure. For example, in each embodiment, each functional unit, each means, each step, or the like can be added to another embodiment or replaced with each functional unit, each means, each step, or the like in another embodiment without any logical contradiction. In each embodiment, a plurality of functional units, means, steps, or the like may be combined to one or may be divided. The embodiments according to the present disclosure described above are not limited to strict implementation according to the respective embodiments described above, and may be implemented by appropriately combining the features or omitting part thereof.

For example, in the embodiments described above, the description has been given of the configuration in which the object detection ranges are dynamically switched between by using the one sensor 5. However, in one embodiment, detection of an object may be performed in the determined object detection ranges by using the plurality of sensors 5. In one embodiment, beamforming may be performed toward the determined object detection ranges by using the plurality of sensors 5.

The embodiments described above are not limited to implementation as the electronic device 1. For example, the embodiments described above may be implemented as a method for controlling a device such as the electronic device 1. For example, the embodiments described above may be implemented as a program executed by a device such as the electronic device 1.

The electronic device 1 according to one embodiment may include, as the minimum configuration, at least part of at least one of the sensor 5 or the control unit 10, for example. On the other hand, the electronic device 1 according to one embodiment may appropriately include at least any of the signal generating unit 21, the synthesizer 22, the phase control units 23, the amplifiers 24, and the transmission antennas 25 as illustrated in FIG. 2 in addition to the control unit 10. The electronic device 1 according to the one embodiment may appropriately include at least any of the reception antennas 31, the LNAs 32, the mixers 33, the IF units 34, and the AD conversion units 35 instead of or along with the functional units described above. The electronic device 1 according to the one embodiment may include the storage unit 40. As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antennas 25 and the reception antennas 31 may be installed outside the mobility device 100.

REFERENCE SIGNS LIST

1 electronic device
5 sensor
10 control unit
11 distance FFT processing unit
12 velocity FFT processing unit
13 distance-velocity detection determining unit
14 angle-of-arrival estimating unit
15 object detecting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 storage unit
50 ECU
100 mobility device
131 shift register
132 sorting unit
133 data selecting unit
134 threshold calculating unit
135 weight setting unit
136 detection determining unit
200 object

The invention claimed is:

1. An electronic device comprising:
   a transmission antenna that transmits a transmission wave;
   a reception antenna that receives a reflected wave that is the transmission wave having been reflected; and
   a control unit that
   establishes reference regions non-contiguously in a distance direction and a relative velocity direction with respect to a test region in a two-dimensional distribution of signal intensities based on a reception signal, received as the reflected wave, in the distance direction and the relative velocity direction, and sets a threshold for use in detection of a target, based on an order statistic among the signal intensities in the reference regions, the reference regions being separated from each other in a distance direction from near to far while the reference regions change between fast and slow in relation to a change in the distance direction from near to far beginning at a distance further than the target; and
   detects the target by using a constant false alarm rate, based on a transmission signal transmitted as the transmission wave and the reception signal.

2. The electronic device according to claim 1, wherein the control unit establishes the reference regions non-contiguously in the two-dimensional distribution of the signal intensities based on the reception signal in the distance direction and the relative velocity direction, the signal intensities being obtained through at least one of distance Fourier transform processing and velocity Fourier transform processing.

3. The electronic device according to claim 1, wherein the control unit determines whether the target is present, based on a signal intensity in a cell under test in the test region and the threshold.

4. The electronic device according to claim 1, wherein the control unit establishes a guard region around the test region.

5. The electronic device according to claim 1, wherein the control unit establishes a guard region between the test region and the reference regions in the distance direction.

6. The electronic device according to claim 1, wherein the control unit comprises a shift register that is two-dimensional in the distance direction and the relative velocity direction and that includes a cell under test in the test region and reference cells in the reference regions.

7. The electronic device according to claim 6, wherein in the shift register, the signal intensities based on the reception signal input from one end at a predetermined sampling frequency are shifted toward another end in a first-in first-out manner.

8. The electronic device according to claim 6, wherein the control unit comprises a sorting unit that sorts, in ascending order, the signal intensities output from the reference cells in the shift register.

9. The electronic device according to claim 8, wherein the control unit comprises a data selecting unit that selects a signal intensity at a predetermined place in order from among the signal intensities sorted by the sorting unit.

10. The electronic device according to claim 9, wherein the control unit comprises a threshold calculating unit that sets the threshold for use in detection of the target, based on the signal intensity selected by the data selecting unit.

11. The electronic device according to claim 1, wherein the control unit establishes the reference regions non-contiguously in the relative velocity direction and on a far side in the distance direction with respect to the test region in the two-dimensional distribution of the signal intensities based on the reception signal in the distance direction and the relative velocity direction, and sets the threshold for use in detection of the target, based on an order statistic among the signal intensities in the reference regions.

12. A method for controlling an electronic device, the method comprising:
- a step of transmitting a transmission wave from a transmission antenna;
- a step of receiving, from a reception antenna, a reflected wave that is the transmission wave having been reflected;
- a step of establishing reference regions non-contiguously in a distance direction and a relative velocity direction with respect to a test region in a two-dimensional distribution of signal intensities based on a reception signal, received as the reflected wave, in the distance direction and the relative velocity direction;
- a step of setting a threshold for use in detection of a target, based on an order statistic among the signal intensities in the reference regions, the reference regions being separated from each other in a distance direction from near to far while the reference regions change between fast and slow in relation to a change in the distance direction from near to far beginning at a distance further than the target; and
- a step of detecting the target by using a constant false alarm rate, based on a transmission signal transmitted as the transmission wave and the reception signal received as the reflected wave.

13. A non-transitory computer-readable recording medium storing computer program instructions, which when executed by a computer, cause the computer to:
- transmit a transmission wave from a transmission antenna;
- receive, from a reception antenna, a reflected wave that is the transmission wave having been reflected;
- establish reference regions non-contiguously in a distance direction and a relative velocity direction with respect to a test region in a two-dimensional distribution of signal intensities based on a reception signal, received as the reflected wave, in the distance direction and the relative velocity direction;
- set a threshold for use in detection of a target, based on an order statistic among the signal intensities in the reference regions, the reference regions being separated from each other in a distance direction from near to far while the reference regions change between fast and slow in relation to a change in the distance direction from near to far beginning at a distance further than the target; and
- detect the target by using a constant false alarm rate, based on a transmission signal transmitted as the transmission wave and the reception signal received as the reflected wave.

14. The electronic device according to claim 1, wherein the reference regions are separated from each other in the distance direction from near to far while those reference regions change in groups between fast and slow in relation to the change in the distance direction from near to far beginning at the distance further than the target.

15. The method according to claim 12, wherein the reference regions are separated from each other in the distance direction from near to far while those reference regions change in groups between fast and slow in relation to the change in the distance direction from near to far beginning at the distance further than the target.

16. The non-transitory computer-readable recording medium according to claim 13, wherein the reference regions are separated from each other in the distance direction from near to far while those reference regions change in groups between fast and slow in relation to the change in the distance direction from near to far beginning at the distance further than the target.

* * * * *